United States Patent [19]

DiMatteo et al.

[11] 4,259,589

[45] Mar. 31, 1981

[54] GENERATION OF CONTIGUOUS DATA FILES OF THREE-DIMENSIONAL INFORMATION

[75] Inventors: Paul DiMatteo, Huntington; Howard Stern, Greenlawn, both of N.Y.

[73] Assignee: Solid Photography, Inc., Melville, N.Y.

[21] Appl. No.: 59,158

[22] Filed: Jul. 20, 1979

[51] Int. Cl.³ ............................................. G01B 11/00
[52] U.S. Cl. ....................................... 250/558; 356/2; 356/375
[58] Field of Search ............... 250/558; 356/375, 389, 356/390, 2, 152

[56] References Cited

U.S. PATENT DOCUMENTS

| | | | |
|---|---|---|---|
| 3,866,052 | 2/1975 | DiMatteo et al. | 250/558 |
| 3,962,588 | 6/1976 | DiMatteo et al. | 356/2 X |
| 4,145,991 | 3/1979 | DiMatteo et al. | 356/375 |

Primary Examiner—David C. Nelms
Assistant Examiner—Edward P. Westin
Attorney, Agent, or Firm—Eisenman, Allsopp & Strack

[57] ABSTRACT

The method of generating data for files containing information regarding three-dimensional surface configurations, involving selective compilation of area data through use of projected rays of differing orientation, recording of the radiation patterns produced by these rays on the surface, and correlation of records from overlapping fields of view to meld information from contiguous areas into a continuous data bank.

11 Claims, 11 Drawing Figures

GENERATION OF CONTIGUOUS DATA FILES OF THREE-DIMENSIONAL INFORMATION

FIELD OF THE INVENTION

This invention relates to methods used in the reproduction of objects in three dimensions; more particularly, it relates to methods for generating accurate three-dimensional records suitable for storage and generation of three-dimensional information defining object surfaces.

DESCRIPTION OF THE PRIOR ART

Among known methods for three-dimensional object reproduction, systems have been provided for the selective exposure of planar segments of such objects to generate a series of photographs of segments of the object surface. Such photographs were then processed to determine the object surface boundaries and corresponding three-dimensional slices of the subject were made and assembled by "stacking" to reproduce the object. Extensive effort is involved in the transition from two-dimensional photographic data to three-dimensional space in the processing of the large numbers of such single contour photographs and the effort greatly detracts from the commercial value of such methods.

The inventors' U.S. Pat. No. 3,866,052 which issued on Feb. 11, 1975, discloses a method for generating three-dimensional data information files suitable for utilization of computer accumulation and processing. In accordance with this disclosure, selected portions of an object surface are irradiated by radiant energy in a predetermined manner. Corresponding records of the irradiated surface portions, or segments, are made on film or other suitable recording media and a signal is generated that is selectively indicative of which of a series of successive records shows a particular surface point to be illuminated.

This prior disclosure of the inventors, utilizes a camera and projector, and the positional coordinates of these elements are of great importance. Where the coordinates of the camera are known, the signals can be used to reconstruct the points of interest in exacting spacial relationship to other points on the object surface. On the other hand, environmental disturbances, such as vibration or camera movement, will disrupt the generation of the corresponding three-dimensional reproduction and it is necessary to redetermine the initial position coordinates in tedious and often inexact manners. U.S. Pat. Nos. 3,936,649 and 3,962,588, issued Feb. 3, 1976 and June 8, 1976, respectively to the inventors, disclose apparatus and methods which facilitate ready determination and redetermination of camera positions and effectively yield calibration methods useful for practicing the technique previously described.

SUMMARY OF THE INVENTION

It has been found that when the method of U.S. Pat. No. 3,866,052 is used to generate three-dimensional information representative of large objects, including such units as buildings, it is necessary to move the camera and projector pair repeatedly. This is necessary because the field of view of the projector and of the associated camera must be kept to a small portion of the object being viewed in order to achieve a usable and reasonable resolution and accuracy.

As the camera-projector position is modified and the method of the prior patent carried out, information is created for a three-dimensional file for each segment of the area irradiated. In the absence of calibration via the methods of the subsequent patent disclosures, distortions may be present in such a data base; however, utilization of the described calibration methods becomes onerous and overburdening because the grid sizes required in the latter disclosures might approach the size of a significant portion of the object itself.

The distortions present in each data file generated by a camera-projector pair, make it difficult to align the data files of contiguous portions of a large object, even when those portions are representative of separate fields of view having a substantial area in common. The overlapping area may exist in the two data files, for example, with different scale factors or may have distortions due to erroneous assumptions with regard to the important camera-projector location geometry that forms the base point for the data file. The merger of independent data files from successive camera-projector positions is an onerous computational task since the mathematical correlation of a plurality of such flies is dependent upon the presence of a single linear scale factor.

On the other hand, the mathematical correlation problem is eased if common points in the overlap area of adjacent data files can be identified on a pair basis; i.e., if each point in one file can be paired with a data point in another file which is representative of the same object point. Having accomplished this, the common points in the two files can be compared and the differential information obtained used to assist in the correction and establishment of initial camera-projector geometry presumptions.

An object of the present invention is to provide a method useful in the generation of recorded information representative of three-dimensional objects.

Another object of the invention is to provide a method of generating data regarding three-dimensional object configurations suitable for recording and storing such information with respect to large objects.

More particularly, an object of the invention is to develop accurate three-dimensional information in a plurality of data files concerning contiguous portions of a three-dimensional object surface and to effect an overlay of corresponding records to generate a continuous data bank representative of the continuous surface; wherein the continuous data bank is machine readable and susceptible to rapid processing.

In accordance with the invention, pairing of common points in data files of contiguous areas is accomplished by generating a sequence of pictures wherein each projection is observed by two cameras of from two distinct positions and wherein the projection sequence defines, or encodes, the equivalent of a group of known rays from a projector node. In accordance with the disclosure of the U.S. Pat. No. 3,866,052, the projection sequence is set up to define families of projection planes passing through the projection node in order to locate an object point in space. To effect coding of the rays, a first family is developed from a horizontal set of projections and a second family is developed from a vertical set of projections. Combining both sets of projections yields an encoded grid, each point of which defines a ray. Thereafter, the projected rays recorded by cameras in two separate positions, are compared to interlock or interleave the records of these separate positions together into a single combined data bank of information.

The development of such records may be effected by utilizing a plurality of projector-camera sets, or alternatively by successive and alternate repositioning of projectors and cameras to overlapping positions so that successive overlapping data files are generated.

The above objects as well as other objects and features of the invention will be more thoroughly understood and appreciated by reference to the following detailed description and drawings.

DESCRIPTION OF THE PREFERRED EMBODIMENTS

Figure 1:
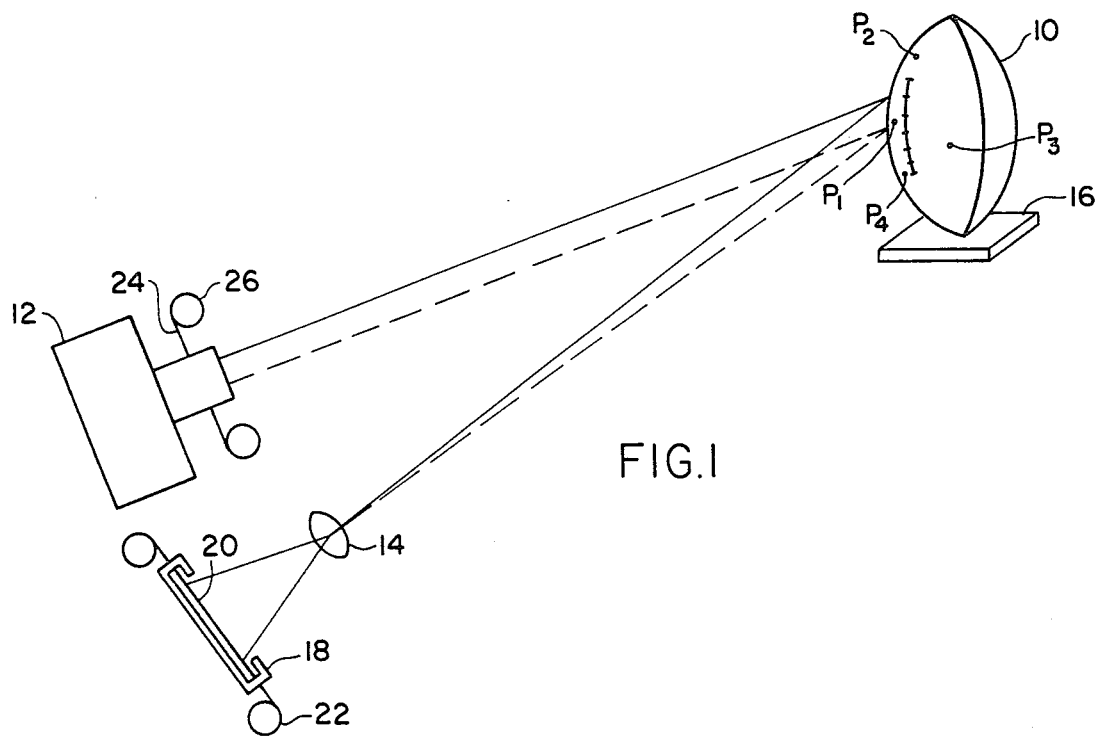
FIG. 1 schematically illustrates a camera-projector pair arranged to radiate a coded light pattern on an object surface for purposes of recording a data file.

FIG. 1 is a reproduction of the corresponding figure in above-identified U.S. Pat. No. 3,866,052. The utilization of a camera-projector pair for the development of a data file that can be stored or used for subsequent reproduction of three-dimensional surface configurations, is fully set forth in this patent. In brief, it will be noted that in FIG. 1, the three-dimensional object 10 includes a surface disposed in the field of projection of a radiant energy projector 12. This surface is also within the field of view of the objective lens 14 associated with a camera element. The object may be supported by a pedestal 16 and the geometric fixed relationship between the pedestal 16, projector 12, and lens 14 represents reference information subsequently employed in reproducing the surface configuration. An element 18 is adapted to support single frames of a recording medium 20 in the focal plane of lens 14. Transport spools 22 may be associated with the record medium and member 18 for selectively advancing the recording medium frames for exposure.

As explained in the cited patent, a masking element 24 is adapted for selective positioning within the projector to develop projected rays for irradiation of selected segments of the object surface. The patent describes the use of horizontally disposed transmissive and non-transmissive portions on a plurality of frames. The arrangement of these portions upon successive frames may be likened to binary coding and the surface segments illuminated by a particular sequence of projections can be uniquely identified.

Figures 2, 3:
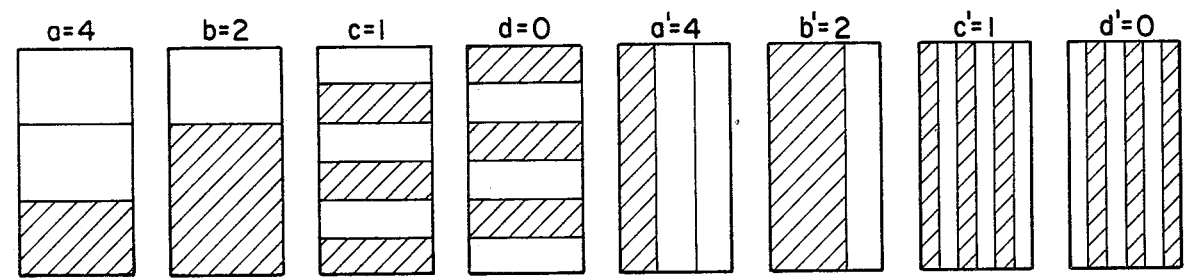
FIG. 2 is a schematic illustrating a horizontal masking arrangement for use in conjunction with the projection of radiant energy upon a three-dimensional object.
FIG. 3 is a schematic illustrating a vertical masking arrangement for use in accordance with the present invention for the projection of radiant energy upon a three-dimensional object.

FIG. 2 is a schematic illustration of four horizontal masking elements of the type described in the above-identified patent. If each frame a, b, c, d is identified by a weighted decimal digit such as 4-2-1-0 as indicated, respectively, above each mask in FIG. 2, the area illuminated by a sequence of projections through these masks, may be identified by a decimal digit equal to the sum of those representative digits identifying the frames that controlled surface irradiation. The chart of FIG. 2a tabulates such designations.

In like manner, masking frames may be provided for the development of vertical projected rays. The schematic illustration of four coded frames of such a masking arrangement is shown in FIG. 3. Here too, each frame may be provided with a weighted decimal designation and the chart of FIG. 3a tabulates the designations identifying particular vertical segments irradiated by utilization of a sequence of projections.

As described more fully hereinafter, the use of these masks and successive irradiation of a three-dimensional surface is directed toward the development of a data file having points or areas that can be uniquely identified and thereafter coordinated with similar data files for contiguous overlapping areas in order to develop a complete data bank representative of the surface configuration of the object being viewed.

Figures 2A, 3A, 4:
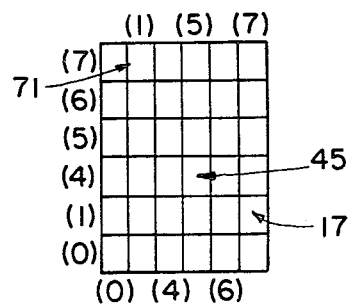
FIG. 2a is a chart of address designations identifying horizontal rays generated by projection through the mask of FIG. 2.
FIG. 3a is a chart of address designations identifying vertical rays generated by projection through the mask of FIG. 3.
FIG. 4 shows the areas defined within a data file by the projection of rays generated with the selective use of the masks of FIGS. 2 and 3.

FIG. 4 is simply a chart or planar presentation of a field of view for a camera, showing the 36 areas identified by use of the illustrative masking elements in FIGS. 2 and 3. It should be appreciated that the invention is not restricted to the use of horizontal and vertical masks, or any particular orthogonal pair of masking systems. Rather, it relates to the method of developing an identifiable set of object surface segments on a recording medium that do not require referral to a particular reference point for recognition. It should also be appreciated that while four frames have been illustrated, the invention is not limited in the number of frames employed and if one uses ten projections with suitably encoded rays, for example, a thousand planes will be developed. In effect, 20 projections with their associated recordings and pictures will identify one million rays.

Figure 5A:
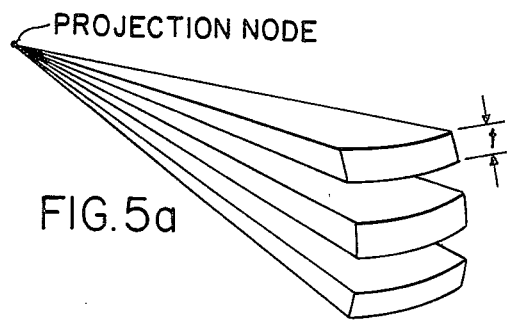
FIGS. 5a, 5b, and 5c are schematic representations of rays projected through horizontal and vertical masks and their combined effect.
Figure 5B:
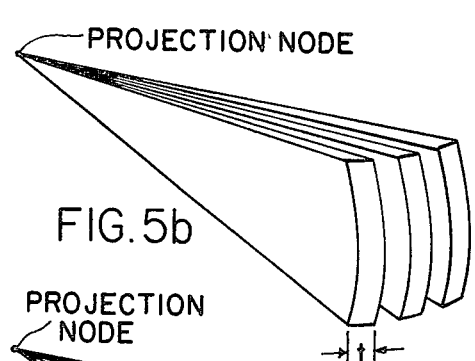
Figure 5C:
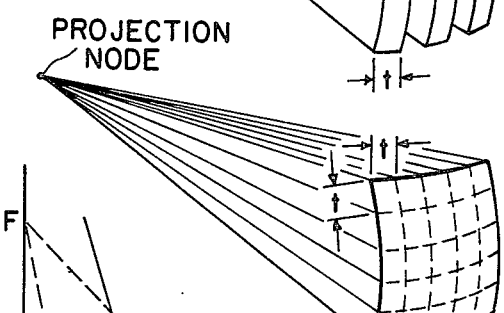

FIGS. 5a, 5b, and 5c pictorially suggest the nature of the emerging projected rays in the horizontal, vertical, and combined modes. As the thickness t approaches zero as a result of finer masking, the illustrated wedges will deteriorate until they each define a surface in space. The combined use of both horizontal and vertical rays will thus effectively permit the presentation of intersecting surfaces or lines; each intersection will define a uniquely identifiable ray passing through the projector node outwardly into object space. The ray, upon striking an object surface, becomes visible to the camera, thus uniquely defining a point on the object surface. The resolution of the areas defined is simply dependent upon the number of rays within any given area.

While the use of a single projector and camera pair is satisfactory for the development of a limited projection and viewing field, it is completely unsatisfactory when the three-dimensional surface being irradiated is larger than the projection and viewing field. The calibration techniques for using a plurality of adjacent fields of above-identified U.S. Pat. Nos. 3,936,649 and 3,962,588 are burdened by size limitations and equipment distortions. Such distortions, when dealing with large objects, may totally change the surface configuration one is attempting to reproduce. For example, a flat surface will be interpreted to be a curved surface if the assumed reference spacing of a camera-projector pair is incorrect. While this is a damaging distortion of an individual data bank taken from a single position, the problem is compounded to unbearable proportions when contiguous fields of view are being accumulated in individual data files for later merging.

Figure 6:
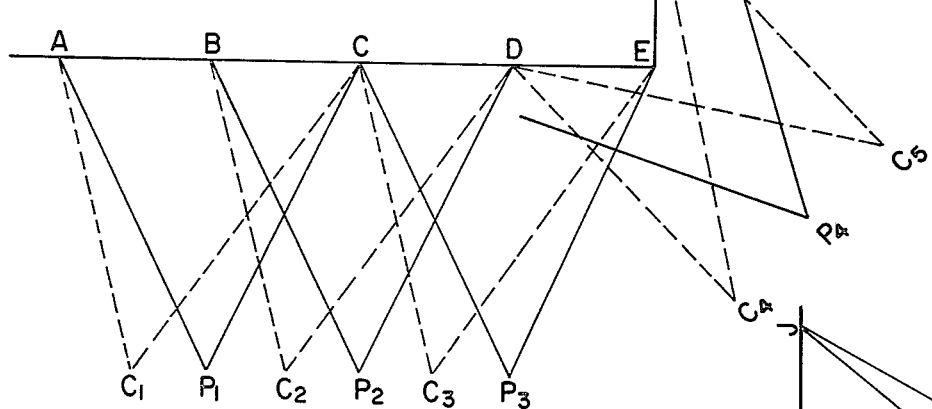
FIG. 6 is a schematic illustration showing one method of practicing the present invention.

For illustrative purposes, consider the compilation of data regarding the surface configuration of a building wall. FIG. 6 is a plan view showing the corner of a building and a plurality of camera and projector positions relative to this wall. The projection field is illustrated with solid lines emanating from each projector position (denoted by P and a numerical subscript indicative of the position). Dashed lines define the camera field of view from each camera position (denoted by "C" and a numerical subscript indicative of position). Each projection field is viewed from at least two camera positions and each camera position views patterns projected from at least two positions.

The wall segments AB, BC, CD, DE, and EF are recorded in eight data files, as follows: segment AB is recorded in a data file generated by projection position $P_1$ and camera position $C_1$; segment BC is recorded in three data files generated by projection position $P_1$ and camera position $C_1$, projection position $P_1$ and camera position $C_2$ and projection position $P_2$ and camera position $C_2$; segment CD is recorded in three data files generated by projection position $P_2$ and camera position $C_2$, projection position $P_2$ and camera position $C_3$, and projection position $P_3$ and camera position $C_3$; segment DE is recorded in four data files generated by projection position $P_3$ and camera position $C_3$, projection position $P_3$ and camera position $C_4$, projection position $P_4$ and camera position $C_4$, and projection position $P_4$ and camera position $C_5$; and finally, segment EF is recorded in two data files generated by projection position $P_4$ and camera position $C_4$, and projection position $P_4$ and camera position $C_5$.

Each wall segment has overlapping portions from the field of view of contiguous projector-camera locations. Thus, the data file from projector position $P_1$ and camera $C_1$ includes point B on the wall; the data file from projector position $P_2$ and camera $C_2$ includes point C on the wall; etc. The common points or areas within two camera-projector fields are linkable because they are identified by a common set of rays in both fields. Since this is true, information records from separate cameras or projectors can be used to perform stereo processing. Unlike prior systems, it will be seen that the accumulated data is discretely identifiable in digital terms and can be used to correlate contiguous data files without the intervention of an operator.

Use of any projection position which transmits codes to a surface which is visible to a camera position allows the automated derivation of stereo information since the code corresponds to a known ray from the projector and the location of the image point on the camera's film frames defines a known ray from the camera. The object surface point must therefore lie on the intersection of the two rays.

Similarly, when two projectors illuminate a surface point with coded patterns that are visible to a common camera position, it is possible to obtain stereo information from the intersection of the two known rays from the two projectors; the ray identification being taken from the unique codes found for each projector at a given point on the film frames. In this particular case, camera distortion is of no consequence since the camera is only used to obtain the two projection codes present at a particular point in space. The information as to the position of the surface point on the film frames can be used with a low distortion camera system to check the assumptions made with respect to projector locations. When an assumption of camera or projector position information has an error, it is now possible to correct it because the spatial data for a particular point has been derived from several independent camera-projector positions.

More importantly, three-dimensional data points corresponding to features on a surface can be registered together in a definite manner even though they are arrived at via separate measurement processes. This is achieved via commonality of a camera position for two or more projector positions or via commonality of a projector position for two or more camera positions. In either case a common fan of rays tags the points that are common to the two or more sets of computations that define the three-dimension position of the points.

Figure 7:
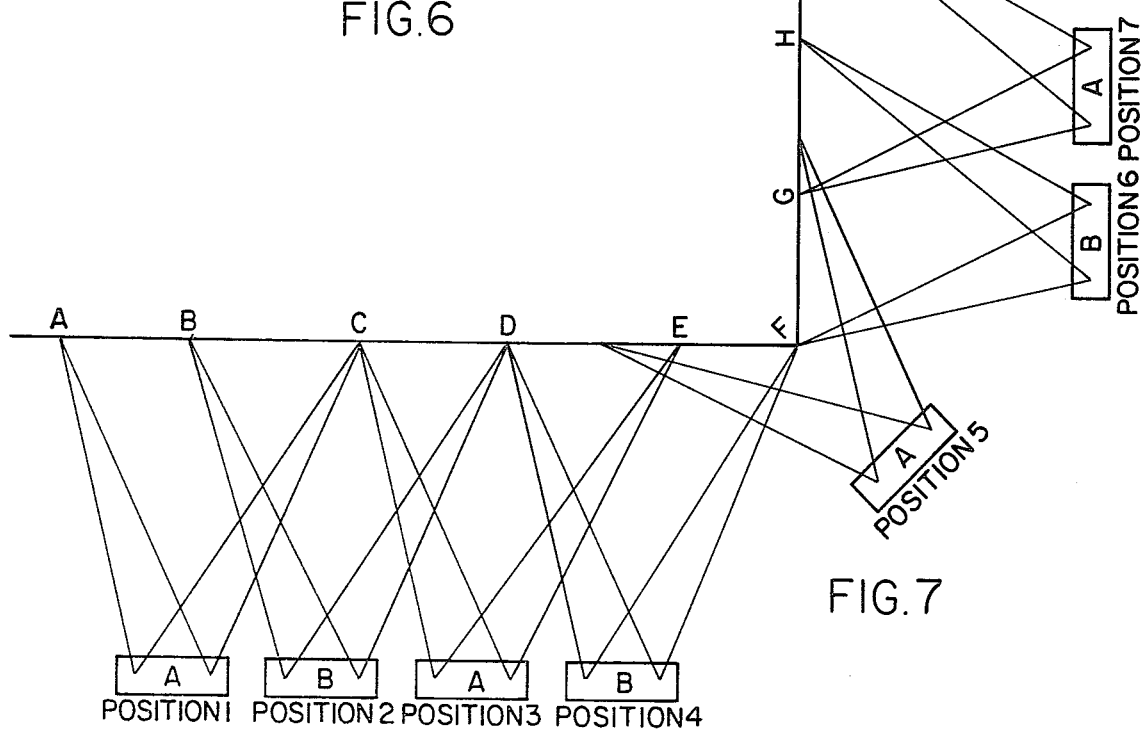
FIG. 7 is a schematic illustration showing a second method of practicing the present invention.

A modification of the previously described method of generating contiguous overlapping data files is illustrated in FIG. 7. Once again, the plan view of a building wall is depicted. Seven positions about this wall are selected. In each position, a sensor consisting of a projector and camera may be located. Only two sensors need be employed. The sensors are used to compile data files and thereafter "leap-frogged" to a position on the other side of their companion where they again go through a complete operating cycle.

In practice, the sensor in position 1 illuminates building segment AC and simultaneously records the projection. The sensor in position 2 also records the projections from position 1 in the overlapping area BC and subsequently, irradiates the area BD for recording by its own camera and also simultaneously irradiates the area BC for the sensor in position 1. Thereafter, the sensor in position 1 is moved to position 3 and the projection recording sequence repeated to develop a data file of the wall segment CE. In this instance, the sensor in position 2 operates in concert with the sensor in position 3 so that each sensor's camera records the other sensor's projection on the overlap wall area CD. The camera associated with each projector can record either one of its own two projection sequences to obtain the information for its own three-dimensional data file. Also, at each sensor position, each camera must record data three separate times, once when its companion sensor system is projecting and is to the left, once when its companion sensor system is projecting and is to the right, and once when its own projector is irradiating the surface.

The aforementioned mode of operation is particularly advantageous because the camera-projector pair constituting a sensor can be rigidly linked together to insure that the projector and camera lens nodes, the film plane, and the projection masks are precisely known and rigidly held with respect to each other. Thus, a consistent set of three-dimensional data is obtained each time a sensor camera records the images of the subject as illuminated by its own projector's projection sequence. In addition, because the camera records the projection sequences of its companion sensor, it is possible to uniquely join the two three-dimensional data files without knowing the exact position in space of either sensor.

This is done by rotating and translating the three-dimensional data files until the points known to be common (via common projection identity) overlay each other.

Alternatively, two cameras may be rigidly joined to form a two-camera/sensor pair whose geometry is precisely known. If two such sensors are used, the equivalent leap-frogging technique can be used with the aid of a coded pattern projector whose position need not be known. The coded projection pattern is used to illuminate a portion of the object while the two sensors are used to observe overlapping fields illuminated by the projector. Each of the two sensors will generate a consistent set of three-dimensional data based on the well-known stereo principle of observing common features from two known camera positions. However, in this case, the manual intervention or correlation necessary to find common features is unnecessary since all of the surface points uniquely identify themselves via the projection code. Thus, each sensor (two cameras, in this case) provides a consistent set of three-dimensional data and the data sets from the two sensors can be combined even though the sensor positions relative to each other are unknown. Again, the combination of the two files is easily achieved because there will be points in the two sets that are known to be identical due to their having been illuminated by the same projection code.

Methods for developing discrete data files that can be correlated to generate a file representative of three-dimensional surface information, have been described. As a result of these methods, one is able to record and utilize information regarding surface configurations of dimensions greatly in excess of the field of view of either projectors or cameras; this without the need for human interpretation or massive reference finding equipment. It is appreciated that modifications of these methods such as the replacement of film cameras with vidicon cameras and the use of various other illumination techniques, will become apparent to those skilled in the art. The inventive aspects thereof are intended to be covered by the annexed claims.

What is claimed is:

1. A method for developing a data bank representative of the surface characteristics of a three-dimensional object, comprising defining a first projection field extending from a first location and including a part of said surface; irradiating portions of said first part by projecting radiant energy from said first location into first predetermined segments of said first projection field; irradiating portions of said first part by projecting radiant energy from said first location into second predetermined segments of said first projection field, said second segments being of different orientation than that of said first segments; and making separate data files from at least two positions, containing records of such irradiated object portions in a succession corresponding to the irradiating succession; the field of view from each of said two positions including an overlapping area; whereby common points within said separate data files can be compared to coordinate said files with each other to effect merger thereof into a data bank representative of the surface characteristics of the field of view from each said position.

2. The method of developing a data bank as defined in claim 1, wherein said first and second predetermined segments are orthogonally disposed to one another.

3. The method of developing a data bank as defined in claim 1, wherein the irradiation of said first predetermined segments is effected by projecting radiant energy in a first group of substantially parallel rays, and the irradiation of said second predetermined segments is effected by projecting radiant energy in a second group of substantially parallel rays.

4. The method of developing a data bank as defined in claim 3, wherein the rays within each group are orthogonally disposed to one another.

5. The method of developing a data bank as defined in claim 1, wherein the field of view from the first position at which said data files are recorded is substantially coextensive with said first projection field, and the field of view from the second position at which said data files are recorded includes an adjacent area of said surface that is not irradiated from said first location.

6. The method of developing a data bank as defined in claim 1 comprising, defining a second projection field extending from a second location and including a second part of said surface, said second projection field also including an overlapping area with said first projection field; irradiating portions of said second part by projecting radiant energy from said second location into first predetermined segments of said second projection field; irradiating portions of said second part by projecting radiant energy from said second location into second predetermined segments of said second projection field, said second segments being of different orientation than that of said first segments; and making separate data files from one of said two positions and a third position containing records of irradiated object portions in a succession corresponding to the irradiating succession; the field of view from said third position including an overlapping area with the field of view from said one of said two positions.

7. The method of developing a data bank as defined in claim 6, wherein said first and second predetermined segments are orthogonally disposed to one another.

8. The method of developing a data bank as defined in claim 6, wherein the irradiation of said first predetermined segments is effected by projecting radiant energy in a first group of substantially parallel rays, and the irradiation of said second predetermined segments is effected by projecting radiant energy in a second group of substantially parallel rays.

9. The method of developing a data bank as defined in claim 8, wherein the rays of said first and second group are orthogonally disposed to one another.

10. The method of developing a data bank as defined in claim 6, wherein the field of view from said one of said two positions at which said data files are recorded is substantially coextensive with said second projection field, and the field of view from said third position at which said data files are recorded includes an adjacent area of said surface that is not irradiated from said second location.

11. The method of developing a data bank as defined in claim 6, wherein the data files from said two positions based on irradiation from said first location are made simultaneously at said two positions, thereafter the data files from said one of said two positions and said third position based on irradiation from said second location are made, and thereafter the data files from said third position based on irradiation from said second location are made.

* * * * *